(12) United States Patent
Schreiber et al.

(10) Patent No.: US 10,184,802 B2
(45) Date of Patent: Jan. 22, 2019

(54) PROJECTION ORIENTATION CORRECTION SYSTEM FOR VEHICLE UTILIZING A PROJECTION DEVICE

(71) Applicants: Hyundai America Technical Center, Inc, Superior Township, MI (US); Hyundai Motor Company, Seoul (KR); Kia Motors Corporation, Seoul (KR); Hyundai Motor Europe Technical Center GmbH, Russelsheim (DE)

(72) Inventors: Michael Schreiber, Frankfurt am Main (DE); Nilesh Patel, Canton, MI (US); Stefan Lessmann, Frankfurt am Main (DE); Gregory Ardisana, Canton, MI (US); Amanda Christiana, Ann Arbor, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

(21) Appl. No.: 15/427,329

(22) Filed: Feb. 8, 2017

(65) Prior Publication Data
US 2018/0224297 A1    Aug. 9, 2018

(51) Int. Cl.
*H04N 9/31* (2006.01)
*G01C 21/36* (2006.01)

(52) U.S. Cl.
CPC ........ *G01C 21/367* (2013.01); *G01C 21/365* (2013.01); *G01C 21/3661* (2013.01); *G01C 21/3676* (2013.01); *H04N 9/3155* (2013.01); *H04N 9/3179* (2013.01)

(58) Field of Classification Search
CPC .................................................. G01C 21/367
See application file for complete search history.

(56) References Cited

U.S. PATENT DOCUMENTS

2013/0321402 A1    12/2013  Moore et al.

FOREIGN PATENT DOCUMENTS

| DE | 10034381 A1 | 1/2002 |
|---|---|---|
| DE | 102010010314 A1 | 9/2011 |

*Primary Examiner* — Tracy Y. Li
(74) *Attorney, Agent, or Firm* — Mintz Levin Cohn Ferris Glovsky and Popeo, P.C.; Peter F. Corless

(57) ABSTRACT

A method includes: receiving an indication of a destination from a user; determining a route from a current position of a vehicle to the destination; projecting an image of the determined route from the current position of the vehicle to the destination onto ground nearby the vehicle using a projection device equipped in the vehicle; and rotating the projected image such that the projected image is oriented in accordance with the determined route.

19 Claims, 10 Drawing Sheets

| Projector Location | Image Rotation Equation |
|---|---|
| Left Hand Side (LH) | 90° - α |
| Right Hand Side (RH) | -90° - α |
| Rear | 180° - α |

α : Vehicle Orientation

FIG. 9

PROJECTION ORIENTATION CORRECTION SYSTEM FOR VEHICLE UTILIZING A PROJECTION DEVICE

TECHNICAL FIELD

The present disclosure relates generally to projection systems and, more particularly, to a projection orientation correction system for a vehicle utilizing a projection device.

BACKGROUND

Navigation systems are often used in conjunction with vehicular travel to direct a user of a vehicle (e.g., driver or passenger) to a destination selected by the user. For various reasons, however, the user may not always arrive at the exact location of the destination, leaving a distance remaining between the vehicle and the destination that the user must walk. For example, if a user drives a vehicle to a restaurant, shop, theater, or the like, and the user is required to park the vehicle, there will be a distance remaining between the location of the parked vehicle and the destination. In another example, if a user takes a taxi to a destination, there will be a distance remaining between the location at which the user is dropped off and the destination. In yet another example, a user utilizing a ride sharing service may be transported to a drop off location and required to walk from there to a meeting point with friends.

In either scenario, the distance remaining between the vehicle from which the user exits and the destination may be significant depending on circumstances. Furthermore, the location at which the user exits the vehicle may be unfamiliar, and as a result, the directions from the vehicle to the destination may not be clear. This can ultimately hinder the user from reaching his or her destination.

SUMMARY

The present disclosure provides techniques for providing a user of a vehicle with a visual representation of directions to a destination on the ground nearby the vehicle, such that the representation is viewable by the user upon exiting the vehicle. The visual representation is produced using one or more projection devices equipped in the vehicle capable of projecting an image onto the ground. The projected image may include a map showing the current location of the vehicle and the user's destination, as well as directions overlaying the map indicating a path for the user to follow while walking from the vehicle to the destination. The projected image may also be automatically rotated in accordance with the determined route. For example, rotation of the projected image can orient the image with an initial direction of travel defined by the determined route, or with a direction of a vector connecting a starting point of the determined route and an ending point of the determined route. Alternatively, rotation of the projected image can orient the image north. After being provided with a projected image containing directions from the current location of the vehicle to a destination upon exiting the vehicle, with the image being oriented to enable a user to easily discern information therein, the user can find his or her way from the vehicle to the destination more quickly and reliably.

According to embodiments of the present disclosure, a method includes: receiving an indication of a destination from a user; determining a route from a current position of a vehicle to the destination; projecting an image of the determined route from the current position of the vehicle to the destination onto ground nearby the vehicle using a projection device equipped in the vehicle; and rotating the projected image such that the projected image is oriented in accordance with the determined route.

The projected image may include a map showing the current position of the vehicle and the destination and include at least one direction of travel from the current position of the vehicle to the destination overlaid on the map. The determined route may define at least one direction of travel from the current position of the vehicle to the destination based on one or more pathways between the current position of the vehicle and the destination.

The rotating of the projected image may include: determining a first direction of travel which is first in order among the at least one direction of travel; and rotating the projected image such that the projected image is oriented in the first direction of travel. Alternatively, the rotating of the projected image may include: determining a vector connecting a starting point of the determined route and an ending point of the determined route; and rotating the projected image such that the projected image is oriented in a direction of the determined vector.

The projection device may be one of a plurality of projection devices equipped in the vehicle. For example, the plurality of projection devices may include at least two of: a first projection device disposed on a left side of the vehicle, a second projection device disposed on a right side of the vehicle, and a third projection device disposed on a rear side of the vehicle.

In addition, the method may further include: selecting which projection device of the plurality of projection devices to project the image; and projecting the image using the selected projection device. The method may also include: identifying which door of a plurality of doors of the vehicle has opened; and selecting which projection device of the plurality of projection devices to project the image based on the identified opened door. The method may also include: identifying at least two doors of a plurality of doors of the vehicle that have opened; and selecting at least two projection devices of the plurality of projection devices to project the image based on the at least two identified opened doors. Additionally, the method may further include: identifying one or more doors of a plurality of doors of the vehicle that have opened; and setting a projection size or a projection direction of the projected image based on the one or more identified opened doors.

Furthermore, the method may further include deactivating the projection of the image when a predetermined amount of time elapses after activating the projection of the image. Similarly, the method may further include: detecting a distance between the user and the vehicle; and deactivating the projection of the image when the detected distance is greater than a predetermined distance.

The method may further include: detecting that a door of the vehicle has opened; and activating the projection of the image in response to detecting that the door of the vehicle has opened.

In addition, the projection device may be mounted at a location proximate to a door of the vehicle. For instance, the projection device may be mounted at a rocker panel beneath a door of the vehicle. Also, a power consumption of the projection device may be less than or equal to 90 watts.

The method may further include: determining a location of the projection device; detecting an orientation of the vehicle; calculating an image rotation amount according to the determined location of the projection device and the detected orientation of the vehicle; and rotating the projected image by the calculated image rotation amount.

Furthermore, in accordance with embodiments of the present disclosure, a system includes: at least one projection device equipped in a vehicle and configured to project an image; and a control unit equipped in the vehicle and configured to: receive an indication of a destination from a user, determine a route from a current position of the vehicle to the destination, control the at least one projection device so as to project an image of the determined route from the current position of the vehicle to the destination onto ground nearby the vehicle, and rotate the projected image such that the projected image is oriented in accordance with the determined route.

Furthermore, in accordance with embodiments of the present disclosure, a method includes: receiving an indication of a destination from a user; determining a route from a current position of a vehicle to the destination; projecting an image of the determined route from the current position of the vehicle to the destination onto ground nearby the vehicle using a projection device equipped in the vehicle; and rotating the projected image such that the projected image is oriented north.

Furthermore, in accordance with embodiments of the present disclosure, a system includes: at least one projection device equipped in a vehicle and configured to project an image; and a control unit equipped in the vehicle and configured to: receive an indication of a destination from a user; determine a route from a current position of the vehicle to the destination; control the at least one projection device so as to project an image of the determined route from the current position of the vehicle to the destination onto ground nearby the vehicle; and rotate the projected image such that the projected image is oriented north.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 9 illustrates an exemplary table for calculating an image rotation amount needed to orient the projected image north.

Figure 1:
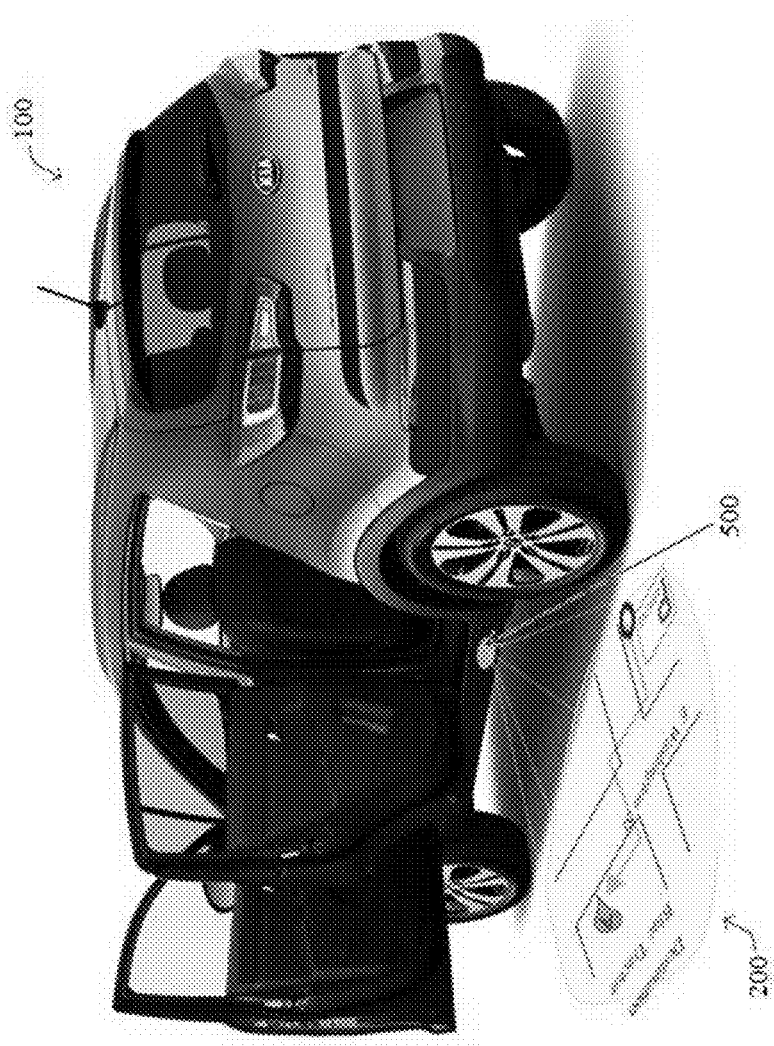
FIG. 1 illustrates an exemplary vehicle equipped with a projection system according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to embodiments of the present disclosure, the disclosed techniques utilize one or more projection devices equipped in a vehicle to provide a user of the vehicle with a visual representation of directions to a destination on the ground nearby the vehicle, such that the representation is viewable by the user upon exiting the vehicle. Specifically, the one or more projection devices equipped in the vehicle can project an image onto the ground including a map showing the current location of the vehicle and a destination selected by the user. The projected image can also include directions overlaying the map indicating a route for the user to follow when walking from the vehicle to the destination.

Additionally, the projected image may be automatically rotated to enable a user to easily discern information in the image. For instance, the projected image can be rotated in accordance with the determined route, e.g., to orient the image with an initial direction of travel defined by the determined route, or with a direction of a vector connecting a starting point of the determined route and an ending point of the determined route. Alternatively, rotation of the projected image can orient the image north.

FIG. 1 illustrates an exemplary vehicle equipped with a projection system according to embodiments of the present disclosure. As shown in FIG. 1, the vehicle 100 may include one or more projection devices 500 operable to project an image 200 onto ground nearby the vehicle 100. The projection device(s) 500 may be any suitable projection device known in the art.

The image 200 projected by the one or more projection devices 500 may include a map showing a current position of the vehicle 100 and a destination selected by a user (e.g., driver or passenger), as well as a route from the current position of the vehicle 100 to the destination. The control unit of the vehicle 100 may determine the route using navigation techniques generally known in the art. For instance, the route may define at least one direction of travel, e.g., walking directions, public transit directions, etc., from the current position of the vehicle 100 to the destination overlaid on the map. The directions of travel may be established based on one or more pathways between the current position of the vehicle 100 and the destination.

The one or more projection devices 500 may be equipped in the vehicle 100 in a manner which enables the devices to project an image 200 onto the ground nearby the vehicle 100. For instance, a projection device 500 may be disposed proximate to any vehicle door (e.g., at a rocker panel beneath a door, as shown in FIG. 1) to allow the user to view the projected image 200 immediately upon exiting the vehicle 100 through said door. It should be noted, however, that the positioning of the projection device 500 on the vehicle 100 shown in FIG. 1 is merely one of many possible arrangements. Further, the image 200 may be projected by the projection device 500 in a manner which allows for optimal readability by automatically controlling display characteristics of the image 200, such as its angle, orientation, position, text attributes, and the like. In one particular example, the image 200 can be automatically rotated based on various factors to allow the user to readily discern information contained in the image, as described in greater detail below.

The one or more projection devices 500 may include any projection device generally known in the art capable of projecting an image onto the ground nearby the vehicle 100. Because the projection devices 500 would draw power from the battery of the vehicle 100, power consumption of each projection device 500 may be limited, e.g., 90 watts or less, in order to reduce the load on the battery which supplies power to numerous other components in the vehicle. The duration of image projection by the projection devices 500 may also be limited, as described in further detail in FIGS. 10A and 10B, in order to limit the amount of power drawn from the battery.

At the same time, the projection devices 500 must be capable of outputting the image 200 at a sufficient brightness to allow the user to discern the contents thereof, particularly on a sunny day. As an example, the image 200 may need to be projected with a brightness of at least 400-500 lumens per square meter ($m^2$) for the image to be easily read amid daylight. If the projection size of the image 200 is 3 $m^2$, for example, it may be required that the projection devices 500 be capable of outputting an image with 1200-1500 lumens. Positioning the projection devices 500 close to the ground, e.g., as shown in FIG. 1, may improve both the brightness and the sharpness of the projected image 200 as it appears on the ground.

Figure 2:
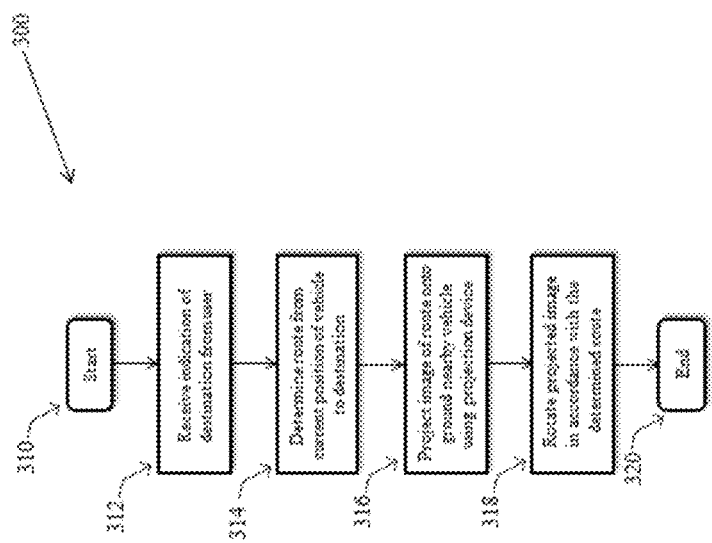
FIG. 2 illustrates an exemplary simplified procedure for operating a vehicle equipped with a projection system in accordance with embodiments of the present disclosure.

FIG. 2 illustrates an exemplary simplified procedure for operating a vehicle equipped with a projection system in accordance with embodiments of the present disclosure. The procedure 300 may start at step 310, and continue to step 312, where, as described in greater detail herein, an image 200 of a route from a current position of the vehicle 100 to a destination selected by a user can be projected by a projection device 500 equipped in the vehicle 100 in an orientation which allows for efficient understanding of the route by the user.

At step 312, an indication of a destination may be received from a user of the vehicle 100. The user may input his or her destination via any suitable means by which a control unit (not shown) of the vehicle 100 receives an indication of the destination, such as a navigation system equipped in the vehicle 100 or a mobile device of the user that is communicatively coupled to the vehicle 100, using a wireless (e.g., Bluetooth, wireless local area network (WLAN), Wi-Fi, infrared, etc.) or wired (e.g., universal serial bus (USB), etc.) connection.

At step 314, a route from a current position of the vehicle 100 to the inputted destination may be determined using any suitable navigation technique generally known in the art. For example, the control unit of the vehicle 100 may determine a route on the basis of acquired global position satellite (GPS) coordinates of the current position of the vehicle 100 and the destination, respectively, and digital maps stored locally in the vehicle 100 or stored on a remote server. Alternatively, a mobile device belonging to the user (not shown) may be leveraged by allowing the device to determine the route locally and transmit the determined route to the vehicle 100.

At step 316, an image 200 of the determined route can be projected onto the ground nearby the vehicle 100 using a projection device 500 equipped in the vehicle 100. The projection device 500 may be one of a plurality of projection devices equipped in the vehicle 100. By way of example, without limitation, the vehicle 100 may be equipped with a first projection device 500 disposed on a right side of the vehicle 100, a second projection device 500 disposed on a left side of the vehicle 100, and/or a third projection device 500 disposed on a rear side of the vehicle 100. Thus, the image 200 may be projected by one or more particular projection devices 500 among several such devices 500 at a given time.

Projection of the image 200 may be triggered upon detecting that the user is exiting the vehicle 100. Such detection may be performed in a variety of ways. For example, the vehicle 100 can monitor whether a door of the vehicle 100 has opened. Upon detecting that a vehicle door has been opened, it may be assumed that the user is exiting the vehicle 100. Additionally, or alternatively, cameras (e.g., around-view monitor (AVM) cameras), ultrasonic sensors, or the like mounted on the vehicle 100, or position data acquired by the user's mobile device and transmitted to the vehicle 100, may be utilized to determine whether the user is positioned outside of the vehicle 100. As another example, vehicle seat sensors may be used to determine that a user is no longer sitting in a seat, in which case it may be assumed that the user is exiting the vehicle.

At step 318, the projected image 200 can be rotated in accordance with the route to the destination determined in step 314 in order to enable the user to efficiently understand and follow the route being displayed. For instance, in a case where the determined route defines an ordered list of directions of travel (e.g., walking directions, biking directions, public transit directions, etc.) from the current position of the vehicle 100 to the destination (e.g., based on one or more pathways between the vehicle 100 and the destination), the projected image 200 can be rotated such that the image is oriented with the direction of travel which is first in order in the list of directions of travel. That is, if the determined route suggests that the user first walk 500 feet along a given road, the projected image 200 can be rotated such that the image is oriented (i.e., in alignment) with the given road. Visualizing the route in orientation with the first direction of travel can allow the user to more easily comprehend the route from his or her location to the destination. Along these lines, a vector can be defined which connects the starting point of the route to the ending point of the route, forming a direction from the vehicle 100 to the destination "as the crow flies." The projected image 200 may also be rotated such that the image is oriented with a direction of this vector. These examples are shown and described in greater detail with respect to FIGS. 6 and 7.

Alternatively, the projected image 200 can be rotated to orient north, regardless of the route to the destination. The amount of image rotation in this case may depend on the location of the projection device 500 projecting the image 200 and the orientation of the vehicle 100 with respect to north. This alternative approach also allows the user to efficiently comprehend the route from his or her location to the destination, as the map contained within the image 200 can always point north which is helpful in finding one's bearings. This example is shown and described in greater detail with respect to FIGS. 8 and 9. Any of the image rotation examples described above can be adopted or may be selected by the user according to his or her preference.

The procedure 300 illustratively ends at step 320. The techniques by which the steps of procedure 300 may be performed, as well as ancillary procedures and parameters, are described in detail herein.

Figure 3:
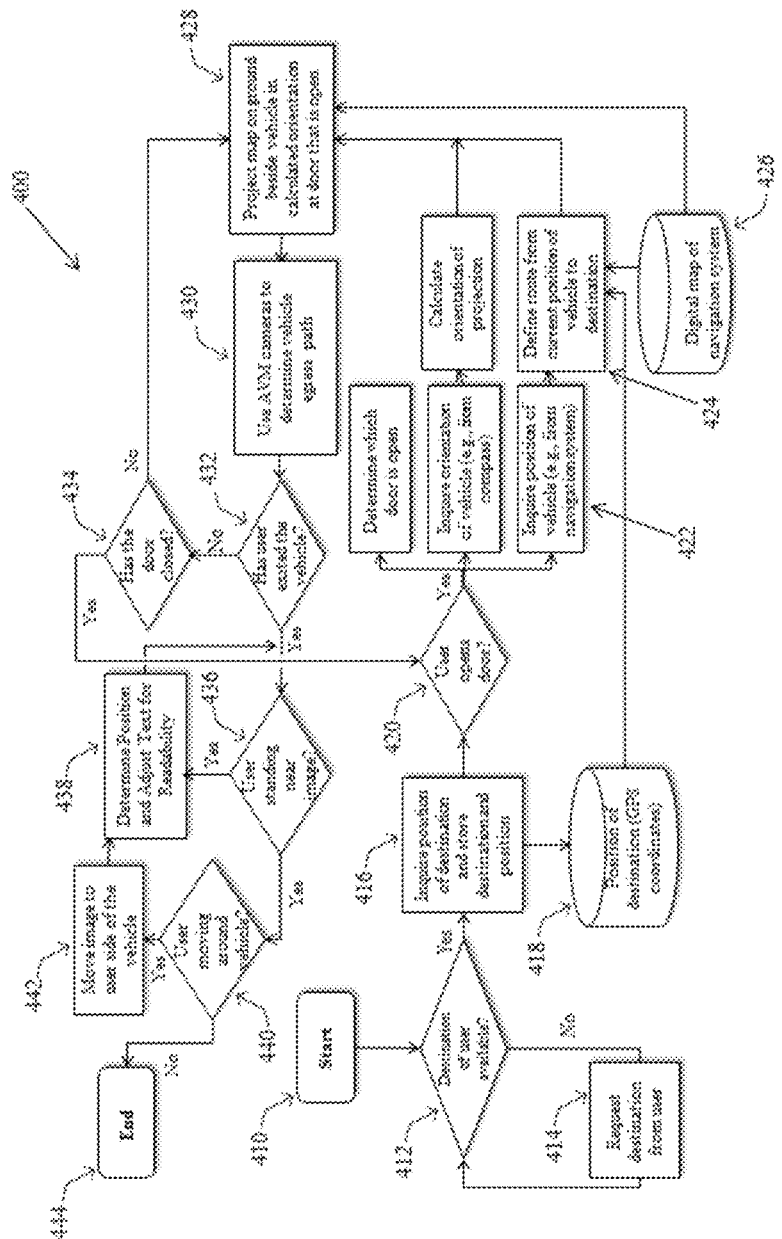
FIG. 3 illustrates an exemplary detailed procedure for operating a vehicle equipped with a projection system in accordance with embodiments of the present disclosure.

It should be noted that the steps shown in FIG. 2 are merely examples for illustration, and certain other steps may be included or excluded as desired (e.g., as shown in FIG. 3). Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

FIG. 3 illustrates an exemplary detailed procedure for operating a vehicle equipped with a projection system in accordance with embodiments of the present disclosure. The procedure 400 may start at step 410, and continue to step 412, where, as described in greater detail herein, an image 200 of a route from a current position of the vehicle 100 to a destination selected by a user can be projected by a projection device 500 equipped in the vehicle 100 and rotated in an orientation which allows for efficient understanding of the route by the user.

Initially, it can be determined whether a destination indicated by a user is available (step 412). If a destination has not yet been inputted by the user (e.g., via a navigation system equipped in the vehicle 100 or a mobile device of the user that is communicatively coupled to the vehicle 100), a request for a destination can be sent to the user (step 414). For instance, a notification can be sent to the user's mobile device requesting a destination, a prompt can be displayed on a navigation system screen equipped in the vehicle 100 requesting a destination, and so forth. When a destination has been received from the user, the vehicle 100 may determine the position of the destination (e.g., latitude and longitude) and store the destination and/or its determined position (step 416). To this end, the vehicle 100 may obtain the GPS position (i.e., GPS coordinates) of the destination by communicating with GPS satellites (step 418).

At step 420, it can be determined whether the user exits the vehicle 100. In one implementation, the vehicle 100 may detect that a door of the vehicle 100 has opened. In such case, it can be determined that a user is exiting or has exited the vehicle 100 when a vehicle door has been opened. Alternatively, or additionally, it can be determined whether a user exits the vehicle 100 using other techniques. For example, ultrasonic sensors equipped on the vehicle 100 can detect the presence of the user outside of the vehicle 100. As another example, AVM cameras equipped on the vehicle 100 can detect the presence of the user outside of the vehicle 100. As yet another example, location information can be obtained by the vehicle 100 from the mobile device of the user and analyzed by the vehicle 100 to determine that the user is outside of the vehicle 100. It should be understood, therefore, that various techniques for detecting that the user exits the vehicle 100 are possible.

In response to detecting that the user exits the vehicle 100, various steps can be performed to prepare for projection an image 200 of the route from the current position of the vehicle 100 to the destination. For instance, at step 422, the vehicle 100 can detect which door has been opened to determine which projection device 500 to activate for projecting the image 200 (if the vehicle 100 is equipped with a plurality of projection devices 500). Also, the vehicle 100 can determine its orientation (e.g., using an internal compass), which can be utilized to calculate the appropriate projection orientation/angle of the image 200 (step 424). In addition, the current position (e.g., GPS coordinates) of the vehicle 100 can be determined (using the vehicle's built-in navigation system, for example).

Then, at step 424, a route from the current position of the vehicle 100 to the destination selected by the user can be calculated. For example, the control unit of the vehicle 100 may determine the route on the basis of the acquired global position satellite (GPS) coordinates of the current position of the vehicle 100 and the destination, respectively, and digital maps stored locally in the vehicle 100 or stored on a remote server (step 426). Alternatively, the mobile device belonging to the user may be leveraged by allowing the device to determine the route locally and transmit the determined route to the vehicle 100.

At step 428, one or more projection devices 500 equipped on the vehicle 100 can project an image 200 of the calculated route from the current position of the vehicle to the user's destination onto ground nearby the vehicle 100, such that the projected image 200 is viewable by the user upon exiting the vehicle 100. The projected image 200 may include a map showing the current position of the vehicle 100 and the destination, as well as directions of travel (e.g., walking directions, biking directions, public transit directions) from the current position of the vehicle 100 to the destination overlaid on the map.

As explained above, the vehicle 100 may be equipped with a plurality of projection devices 500. For instance, without limitation, the vehicle 100 may be equipped with a first projection device 500 disposed on a right side of the vehicle 100, a second projection device 500 disposed on a left side of the vehicle 100, and a third projection device 500 disposed on a rear side of the vehicle 100. Thus, depending on the position of the user, a projection device 500 closest to the user can be selected for projecting the image 200 of the route to the destination.

In this regard, after identifying which door of the vehicle 100 has opened (step 422), a projection device 500 among the plurality of projection devices 500 can be selected to project the image 200 based on the identified opened door. For instance, if a passenger-side door is opened, a projection device 500 on the passenger-side of the vehicle 100 can be selected to project the image 200.

Furthermore, at step 430, the egress path of the user outside of the vehicle 100 can be monitored once the user exits the vehicle (e.g., using one or more cameras equipped on the vehicle 100, using ultrasonic sensors, etc.). By doing so, the projection device 500 used for projecting the image 200 can change as the user's position around the vehicle 100 changes, such that the projected image 200 is easily viewable by the user even as the user is walking around the vehicle 100.

Once it is confirmed that the user exits the vehicle 100 (step 432), the vehicle 100 may determine whether the user is standing near the projected image 200 (step 436) or moving around the vehicle 100 (step 440) as the egress path of the user is monitored. On the other hand, if the vehicle door has closed (step 436), indicating that the user is not exiting the vehicle 100 at the moment, the procedure 400 may return to step 420 where the vehicle 100 continues to monitor whether the user leaves the vehicle 100 (e.g., whether the vehicle door has re-opened).

If the user is standing near the projected image 200, the vehicle 100 may determine display characteristics for the projected image 200 for optimal readability (step 438). In this regard, the image 200 may be projected by the projection device 500 in a manner which allows for optimal readability by controlling display characteristics of the image 200, such as its angle, orientation, position, text attributes, and the like, based on the detected position and/or orientation of the user. For instance, images acquired by one or more cameras (not shown) disposed on the vehicle 100 can be analyzed to estimate a point of view of the user. Based on the estimated user point of view, an appropriate image orientation which allows the user to easily read the image 200 can be determined, and the projection device 500 can project the image 200 with the determined orientation.

Additionally, the projected image 200 can be rotated in accordance with the route to the destination determined in step 424 in order to enable the user to efficiently understand and follow the route being displayed. For instance, in a case where the determined route defines an ordered list of directions of travel (e.g., walking directions, biking directions, public transit directions, etc.) from the current position of the vehicle 100 to the destination (e.g., based on one or more pathways between the vehicle 100 and the destination), the projected image 200 can be rotated such that the image is oriented with the direction of travel which is first in order in the list of directions of travel. That is, if the determined route suggests that the user first walk 500 feet along a given road, the projected image 200 can be rotated such that the image is oriented (i.e., in alignment) with the given road. Also, a vector can be defined which connects the starting point of the route to the ending point of the route, forming a direction from the vehicle 100 to the destination "as the crow flies." The projected image 200 may also be rotated such that the image is oriented with a direction of this vector. These examples are shown and described in greater detail with respect to FIGS. 6 and 7.

Alternatively, the projected image 200 can be rotated to always orient north, regardless of the route to the destination. The amount of image rotation in this case may depend on the location of the projection device 500 projecting the image 200 and the orientation of the vehicle 100 with respect to north. Any of the image rotation examples described above can be adopted or may be selected by the user according to his or her preference.

If the user is moving around the vehicle 100, a different projection device 500 may be selected based on the updated position of the user (step 442). For instance, if the user exits the passenger-side of the vehicle 100 and the passenger-side projection device 500 is initially activated to project the image 200, and then the user walks around the rear of the vehicle 100, the projection device 500 which projects the image 200 may change to the rear-side projection device 500 so the user can continue to view the image 200 even as the user is moving. Similarly, an angle, orientation, or other display characteristics of the image 200 can be changed in response to detecting that the user is moving around the vehicle 100 in order to maintain optimal readability.

Projection of the image 200 may eventually end, e.g., after a predetermined period of time elapses, if the user moves beyond a predetermined distance from the vehicle 100, etc. Deactivation of the image 200 is described in greater detail with respect to FIGS. 10A and 10B.

The procedure 400 illustratively ends at step 444. The techniques by which the steps of procedure 400 may be performed, as well as ancillary procedures and parameters, are described in detail herein.

It should be noted that the steps shown in FIG. 3 are merely examples for illustration, and certain other steps may be included or excluded as desired (e.g., as shown in FIG. 2). Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 4B:
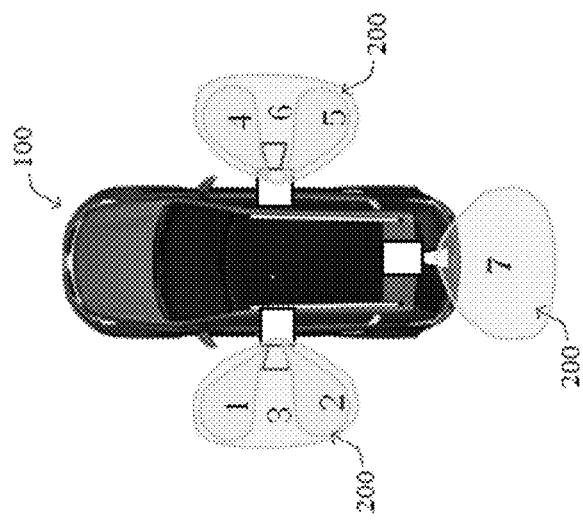
FIGS. 4A and 4B illustrate example image projections of an exemplary vehicle equipped with a projection system according to embodiments of the present disclosure.
Figure 4A:
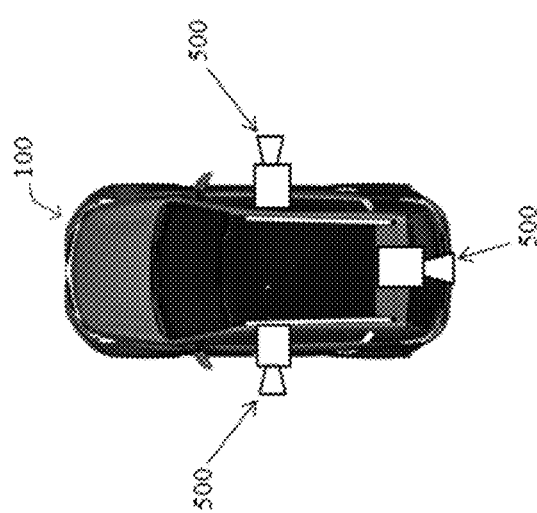

FIGS. 4A and 4B illustrate example image projections of an exemplary vehicle equipped with a projection system according to embodiments of the present disclosure. As shown in FIG. 4A, the vehicle 100 may be equipped with multiple projection devices 500 at various positions on the vehicle 100. Each projection device 500 should be configured to project an image 200 onto ground nearby the vehicle 100 such that the image 200 is visible to the user upon exiting the vehicle 100, as described above. In general, activation of projection by the projection devices 500 may be triggered by the opening of a vehicle door (though other events which indicate the user exits the vehicle 100, such as those described above, may also trigger activation of the projection of the projection devices 500). The control unit of the vehicle 100 may send an activation signal to a projection device 500 to activate the device and initiate projection of the image 200.

As shown in the example arrangement depicted in FIG. 4A, the vehicle 100 may be equipped with a first projection device 500 disposed on a right side of the vehicle 100, a second projection device 500 disposed on a left side of the vehicle 100, and a third projection device 500 disposed on a rear side of the vehicle 100. The projection devices 500 may be installed at various positions on the vehicle 100, such as a rocker panel adjacent to a door (as shown in FIG. 1), on a front or rear bumper, or the like. It should be understood that the arrangement of projection devices 500 shown in FIG. 4A is provided merely for demonstration purposes and does not limit the scope of the present disclosure thereto.

The projection devices 500 may be capable of projecting the image 200 of the route from the current position of the vehicle 100 to the destination selected by the user in various projection orientations (e.g., by adjusting the projection angle, position, direction, size, etc.). For example, as shown in FIG. 4B, the passenger-side and driver-side projection device 500, respectively, may be capable of projecting the image 200 of the route in three different orientations by controlling the display characteristics (e.g., angle, orientation, direction, size, etc.) of the projection. However, the possible image projection orientations are not limited to those shown in FIG. 4B.

Furthermore, the display characteristics of the image 200 can be controlled according to which vehicle door has been opened. For instance, if the user exits the vehicle 100 from the front driver-side door, the driver-side projection device 500 can set the appropriate display characteristics to project the image 200 with projection orientation #1 in FIG. 4B (e.g., by adjusting the projection direction of the image 200 toward the front of the vehicle). On the other hand, if the user exits the vehicle 100 from the rear driver-side door, the driver-side projection device 500 can set the appropriate display characteristics to project the image 200 with projection orientation #2 in FIG. 4B (e.g., by adjusting the projection direction of the image 200 toward the rear of the vehicle). Moreover, if a first user exits the vehicle 100 from the front driver-side door, and a second user exits the vehicle 100 from the rear driver-side door, the driver-side projection device 500 can project the image 200 at a larger size, i.e., projection orientation #3 in FIG. 4B, such that the contents of the projected image 200 are discernable by both of the first and second user (e.g., by increasing the projection size of the image 200).

The passenger-side projection device 500 can operate in a similar manner as the driver-side projection device 500 by adjusting the projection direction and/or size of the image 200 with projection orientations #4-6, based on the opened door(s) of the vehicle 100. Also, both of the passenger-side and driver-side projection devices 500 may be activated concurrently in the event that doors on the passenger-side and driver-side are opened concurrently. Meanwhile, the rear projection device 200 can be activated if the user is detected behind the vehicle (e.g., using cameras (not shown) mounted on the vehicle 100) with projection orientation #7.

Figure 5:
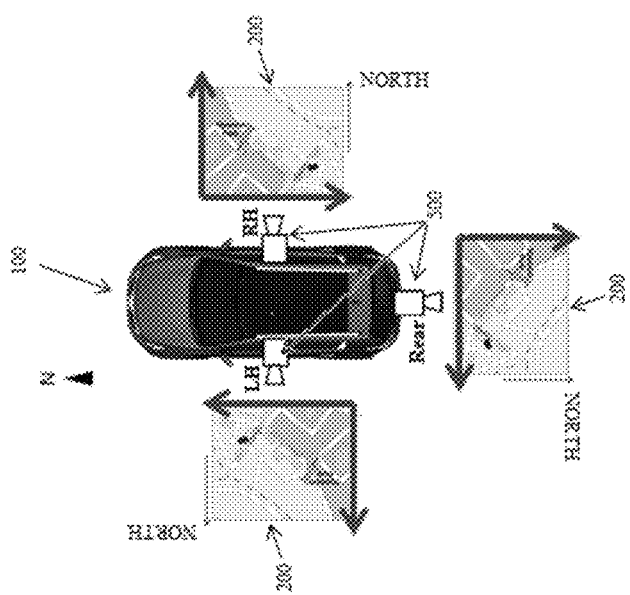
FIG. 5 illustrates example pre-rotation image projection orientations of an exemplary vehicle equipped with a projection system according to embodiments of the present disclosure.

FIG. 5 illustrates example pre-rotation image projection orientations of an exemplary vehicle equipped with a projection system according to embodiments of the present disclosure. In this regard, FIG. 5 shows the default orientation of the projected image 200 by each of the left-hand (LH), right-hand (RH), and rear projection devices 500 prior to rotation of the image 200. That is, before the projected image 200 is rotated, each projection device 500 may project the image 200 such that the map within the image 200 is oriented with north facing away from the respective projection device, as shown in FIG. 5.

Figure 6:
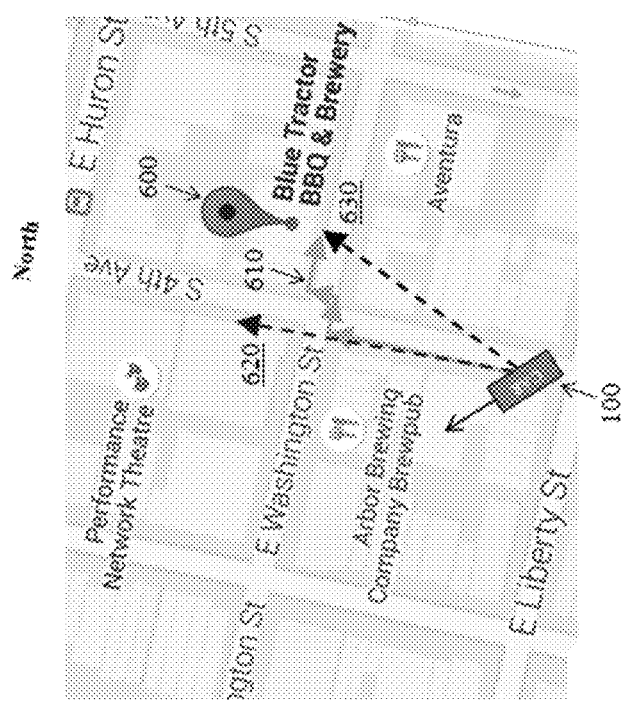
FIG. 6 illustrates an example map including directions of travel from a current position of a vehicle to a user destination.

FIG. 6 illustrates an example map including directions of travel from a current position of a vehicle to a user destination. As shown in FIG. 6, a destination 600 has been selected by the user, and a route from the current position of the vehicle 100 to the selected destination 600 has been determined (using techniques described herein). The determined route may include a set of directions of travel 610 (e.g., walking directions, biking directions, public transit directions, etc.) organized in an ordered fashion. That is, an ordered set of directions of travel 610 can be provided for the user to follow from the vehicle 100 to the destination 600.

In order to facilitate the user's understanding of the route to the destination 600 upon the user exiting the vehicle 100, the projected image 200 can be rotated in accordance with the determined route, allowing for efficient comprehension of the route. For instance, upon determining the set of directions of travel 610, which includes at least one direction of travel, the projected image 200 can be rotated such that the image 200 is oriented in the first direction of travel which is first in order among the set of directions of travel 610. To this end, vector 620 in FIG. 6 is aligned with the first direction of travel (north on S 4th Ave) which is first in order among the determined directions of travel 610 (which comprise the route from the vehicle 100 to the destination 600). The projected image 200 can therefore be oriented along the vector 620 (i.e., aligned with vector 620) to show the user the initial direction of travel, e.g., when leaving the vehicle 100 and walking to the destination 600.

Figure 7:
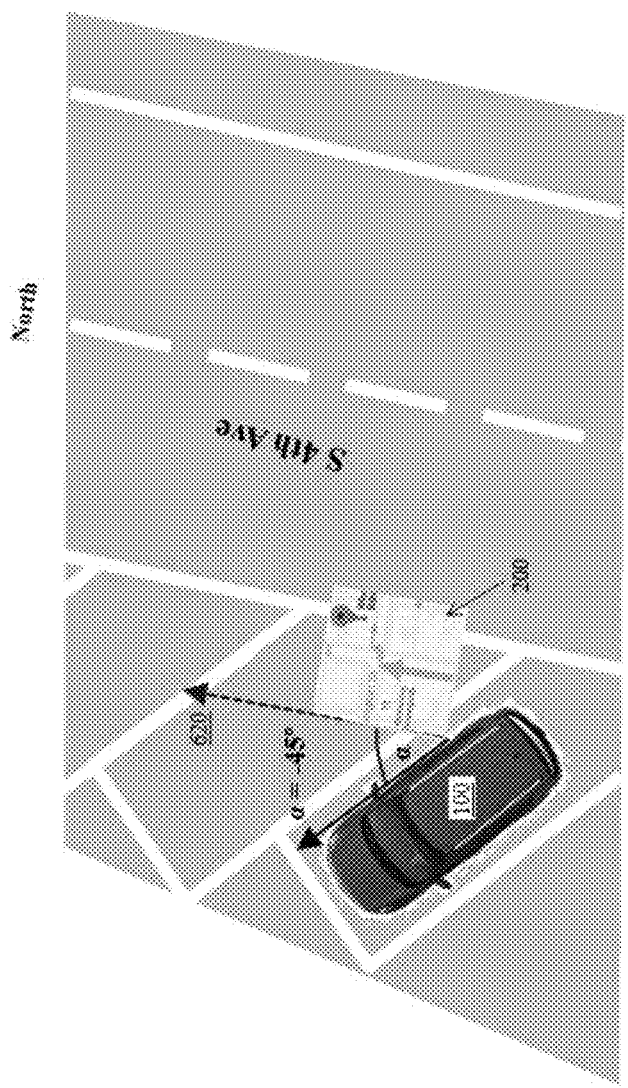
FIG. 7 illustrates an example scenario in which the vehicle projects the image in alignment with the first direction of travel among the set of directions of travel.

To further demonstrate, FIG. 7 illustrates an example scenario in which the vehicle 100 projects the image 200 in alignment with the first direction of travel which is first in order among the set of directions of travel 610. As shown in FIG. 7, the vehicle 100 is parked, allowing for the user to exit the vehicle 100 and walk to the destination 600 (shown in FIG. 6). Upon the user exiting a passenger-side door of the vehicle 100, the passenger-side projection device 500 may project the image 200 showing a map of the surrounding area including the current position of the vehicle 100 and the destination 600, with the directions of travel 610 overlaid on the map. The vector 620 shows the first direction of travel which is first in order among the set of travel directions 610. As shown in FIG. 7, the projected image 200 can be rotated to be in orientation with the vector 620 and the first direction of travel (north on S 4th Ave).

When orienting the projected image 200 with the first direction of travel, the amount of image rotation can be calculated by determining the vehicle's orientation with respect to vector 620 (e.g., using an internal compass, GPS, etc.). In this case, the orientation of the vehicle 100 in its parked position is offset from vector 620 by −45° (α). Thus, referencing the table in FIG. 9, with the right-hand side (passenger-side) projection device 500 being responsible for projecting the image 200 in FIG. 7, the projected image 200 can be aligned with the first direction of travel (north on S 4th Ave) by rotating the image 200 −45° (i.e., −90°−α) from its pre-rotated position (e.g., see FIG. 5).

Additionally, the projected image 200 can be rotated to align with a vector connecting the starting point of the determined route and the ending point of the determined route, forming a direction from the vehicle 100 to the destination "as the crow flies." Referring again to FIG. 6, vector 630 connects the starting point of the determined route (i.e., the current position of the vehicle 100) and the ending point of the determined route (i.e., destination 600). The projected image 200 can therefore be oriented along the vector 630 (i.e., aligned with vector 630) to assist in directing the user to the destination 600.

Similar to the process described above, when orienting the projected image 200 with the vector connecting the starting and ending points of the determined route, the amount of image rotation can be calculated by determining the vehicle's orientation with respect to vector 630 and the projection device 500 (e.g., driver-side, passenger-side, etc.) responsible for projecting the image. As an example, referencing the table in FIG. 9, if the orientation of the vehicle 100 is offset from vector 630 by −60° (α), and the right-hand side (passenger-side) projection device 500 is responsible for projecting the image 200, the projected image 200 can be aligned with vector 630 by rotating the image 200 −30° (i.e., −90°−α) from its pre-rotated position (e.g., see FIG. 5).

Figure 8:
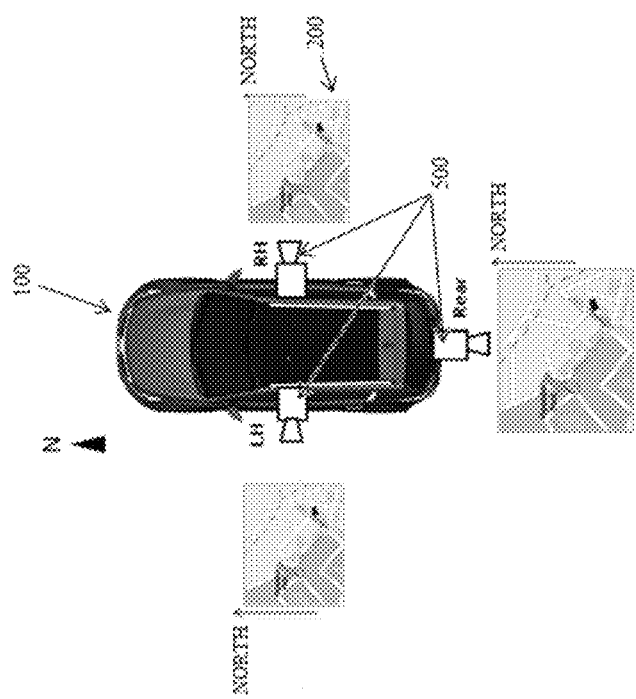
FIG. 8 illustrates an exemplary case in which the projected image is rotated to orient north.

As an alternative to rotating the projected image 200 in accordance with the determined route—demonstrated in FIGS. 6 and 7—the projected image 200 can be rotated so as to orient north, regardless of the route to the destination 600. This alternative approach also allows the user to efficiently comprehend the route from his or her location to the destination, as the map contained within the image 200 can always point north which is helpful in finding one's bearings. In this regard, FIG. 8 illustrates example projected images rotated to orient north. As described above with respect to FIG. 5, the projected image 200 may initially be a static map image with north at the top of the image. Thus, in the default orientation of the projected image 200 by each of the left-hand (LH), right-hand (RH), and rear projection devices 500 prior to rotation of the image, the projected image 200 is oriented with north facing away from the respective projection device, as shown in FIG. 5. The amount of image rotation in this case may depend on the location of the projection device 500 projecting the image 200 and the orientation of the vehicle 100 with respect to north.

For instance, referencing the table in FIG. 9, if the right-hand side (passenger-side) projection device 500 is projecting the image 200 (e.g., the user exits the vehicle 100 through a passenger-side door), and the orientation of the vehicle 100 is due north (i.e., offset α is 0°), the projected image 200 can be oriented north by rotating the image 200 −90° (i.e., −90°−α) from its pre-rotated position (e.g., see FIG. 5). Conversely, if the left-hand side (driver-side) projection device 500 is projecting the image 200 (e.g., the user exits the vehicle 100 through a driver-side door), and the orientation of the vehicle 100 is due north (i.e., offset α is 0°), the projected image 200 can be oriented north by rotating the image 200 90° (i.e., 90°−α) from its pre-rotated position (e.g., see FIG. 5).

FIG. 9 has been referenced hereinabove for the purpose of calculating an amount by which to rotate the projected image 200. In this regard, FIG. 9 illustrates an example table for calculating an image rotation amount, whereby two inputs can be utilized to calculate a rotation amount of the image 200: the location of the active projection device 500, and the orientation of the vehicle 100 (α) with respect to a desired orientation direction. As shown above, the desired orientation direction may be, for example, without limitation, the first direction of travel among a set of directions of travel, a vector connecting the starting and ending points of the determined route, or due north.

Figure 10A:
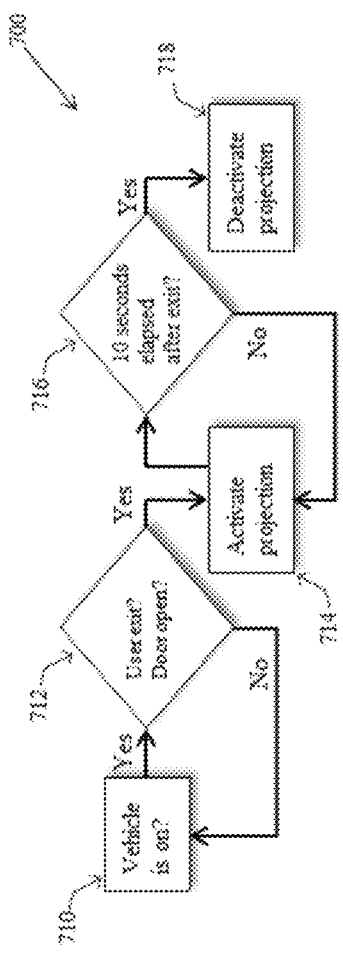
FIGS. 10A and 10B illustrate exemplary procedures for deactivating image projection.
Figure 10B:
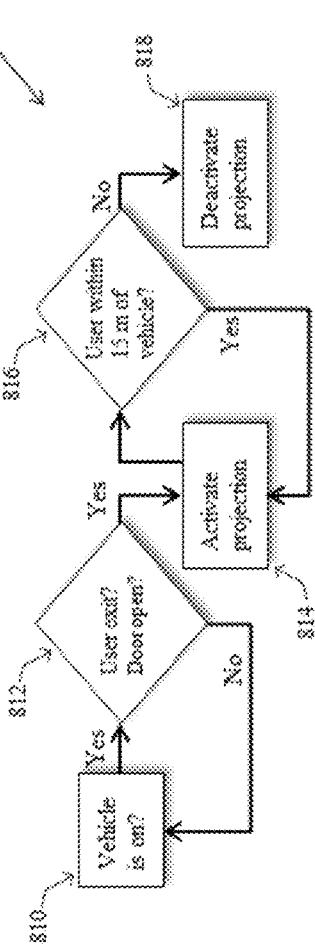

In addition, various techniques for power management of the projection system described herein can help to reduce unnecessary energy consumption. In this regard, FIGS. 10A and 10B illustrate exemplary procedures for deactivating projection of the image 200. In one example shown in FIG. 10A, the projection devices 500 equipped on the vehicle 100 can be deactivated after a predetermined amount of time has elapsed after the user exits the vehicle 100. For instance, in procedure 700, if the vehicle 100 is on (step 710) and it is detected that a user has left the vehicle 100 (step 712), projection of an image 200 illustrating a route from the current position of the vehicle 100 to a destination selected by the user is activated (step 714). Then, it is determined whether a predetermined amount of time (e.g., 10 seconds) has elapsed after the user exits the vehicle 100 (step 716). This step can be performed using a timer, for example. Once the predetermined amount of time has elapsed, projection of the image 200 can be deactivated (step 718).

Alternatively, or additionally, in another example shown in FIG. 10B, the projection devices 500 equipped on the vehicle 100 can be deactivated when the user has moved beyond a predetermined distance from the vehicle 100. For instance, in procedure 800, if the vehicle 100 is on (step 810) and it is detected that a user has left the vehicle 100 (step 812), projection of the image 200 is activated (step 814). Then, it is determined whether a user is within a predetermined range (e.g., 15 meters) of the vehicle 100 (step 816). This step can be performed using various mechanisms, such as cameras mounted on the vehicle 100, an ultrasonic sensor, a laser-based sensor (e.g., Lidar), current position acquired by the user's mobile device, and the like. Once the user has moved beyond the predetermined range, projection of the image 200 can be deactivated (step 818). Thus, as long as the user stays beside the vehicle 100, the projection remains on, and the projection is turned off once the user walks away.

The techniques by which the steps of procedures 700 and 800 may be performed, as well as ancillary procedures and parameters, are described in detail herein.

It should be noted that the steps shown in FIGS. 10A and 10B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified or combined in any suitable manner in accordance with the scope of the present claims.

Accordingly, techniques are described herein that provide a user of a vehicle with an image of route from a current position of the vehicle to a destination selected by the user projected on the ground nearby the vehicle using a projection device equipped on a vehicle, whereby the image is automatically rotated in a manner which allows for efficient understanding of the route by the user upon exiting the vehicle. For instance, the projected image can be oriented in accordance with the determined route, e.g., along the user's initial direction of travel, or oriented to always point north. When provided with an image containing directions to the user's selected destination upon exiting the vehicle, the image being oriented in a helpful manner, the user can find his or her way to the destination more quickly and reliably.

While there have been shown and described illustrative embodiments that provide for vehicular navigation systems utilizing a projection device, it is to be understood that various other adaptations and modifications may be made within the spirit and scope of the embodiments herein. Therefore, the embodiments of the present disclosure may be modified in a suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving an indication of a destination from a user;
   determining a route from a current position of a vehicle to the destination;
   identifying which door of a plurality of doors of the vehicle has opened;
   projecting an image of the determined route from the current position of the vehicle to the destination onto ground nearby the vehicle based on the identified opened door using a projection device equipped in the vehicle; and
   rotating the projected image such that the projected image is oriented in accordance with the determined route,
   wherein the projection of the image is activated in response to detecting that the door of the vehicle has opened.

2. The method of claim 1, wherein the projected image includes a map showing the current position of the vehicle and the destination and includes at least one direction of travel from the current position of the vehicle to the destination overlaid on the map.

3. The method of claim 1, wherein the determined route defines at least one direction of travel from the current position of the vehicle to the destination based on one or more pathways between the current position of the vehicle and the destination.

4. The method of claim 3, wherein the rotating of the projected image comprises:
   determining a first direction of travel which is first in order among the at least one direction of travel; and
   rotating the projected image such that the projected image is oriented in the first direction of travel.

5. The method of claim 1, wherein the rotating of the projected image comprises:
   determining a vector connecting a starting point of the determined route and an ending point of the determined route; and
   rotating the projected image such that the projected image is oriented in a direction of the determined vector.

6. The method of claim 1, wherein the projection device is one of a plurality of projection devices equipped in the vehicle.

7. The method of claim 6, wherein the plurality of projection devices includes at least two of: a first projection device disposed on a left side of the vehicle, a second projection device disposed on a right side of the vehicle, and a third projection device disposed on a rear side of the vehicle.

8. The method of claim 6, further comprising:
   selecting which projection device of the plurality of projection devices to project the image; and
   projecting the image using the selected projection device.

9. The method of claim 8, further comprising:
   selecting which projection device of the plurality of projection devices to project the image based on the identified opened door.

10. The method of claim 8, further comprising:
    identifying at least two doors of a plurality of doors of the vehicle that have opened; and
    selecting at least two projection devices of the plurality of projection devices to project the image based on the at least two identified opened doors.

11. The method of claim 1, further comprising:
    identifying one or more doors of a plurality of doors of the vehicle that have opened; and
    setting a projection size or a projection direction of the projected image based on the one or more identified opened doors.

12. The method of claim 1, further comprising:
    deactivating the projection of the image when a predetermined amount of time elapses after activating the projection of the image.

13. The method of claim 1, further comprising:
    detecting a distance between the user and the vehicle; and
    deactivating the projection of the image when the detected distance is greater than a predetermined distance.

14. The method of claim 1, further comprising:
    determining a location of the projection device;
    detecting an orientation of the vehicle;
    calculating an image rotation amount according to the determined location of the projection device and the detected orientation of the vehicle; and
    rotating the projected image by the calculated image rotation amount.

15. The method of claim 1, wherein the projection device is mounted at a location proximate to a door of the vehicle.

16. The method of claim 1, wherein the projection device is mounted at a rocker panel beneath a door of the vehicle.

17. A system comprising:
    at least one projection device equipped in a vehicle and configured to project an image; and
    a control unit equipped in the vehicle and configured to:
       receive an indication of a destination from a user,
       determine a route from a current position of the vehicle to the destination,
       identify which door of a plurality of doors of the vehicle has opened,
       control the at least one projection device so as to project an image of the determined route from the current position of the vehicle to the destination onto ground nearby the vehicle based on the identified opened door, and
       rotate the projected image such that the projected image is oriented in accordance with the determined route,
       wherein the projection of the image is activated in response to detecting that the door of the vehicle has opened.

18. A method comprising:
    receiving an indication of a destination from a user;
    determining a route from a current position of a vehicle to the destination;
    projecting an image of the determined route from the current position of the vehicle to the destination onto ground nearby the vehicle using a projection device equipped in the vehicle; and rotating the projected image such that the projected image orients north.

19. A system comprising:

at least one projection device equipped in a vehicle and configured to project an image; and a control unit equipped in the vehicle and configured to:

receive an indication of a destination from a user;

determine a route from a current position of the vehicle to the destination;

identify which door of a plurality of doors of the vehicle has opened;

control the at least one projection device so as to project an image of the determined route from the current position of the vehicle to the destination onto ground nearby the vehicle based on the identified opened door; and rotate the projected image such that the projected image orients north, wherein the projection of the image is activated in response to detecting that the door of the vehicle has opened.

* * * * *